Feb. 21, 1956
L. VALLIERE
2,735,920
WELDING CURRENT CONTACT TUBE
Filed July 15, 1952
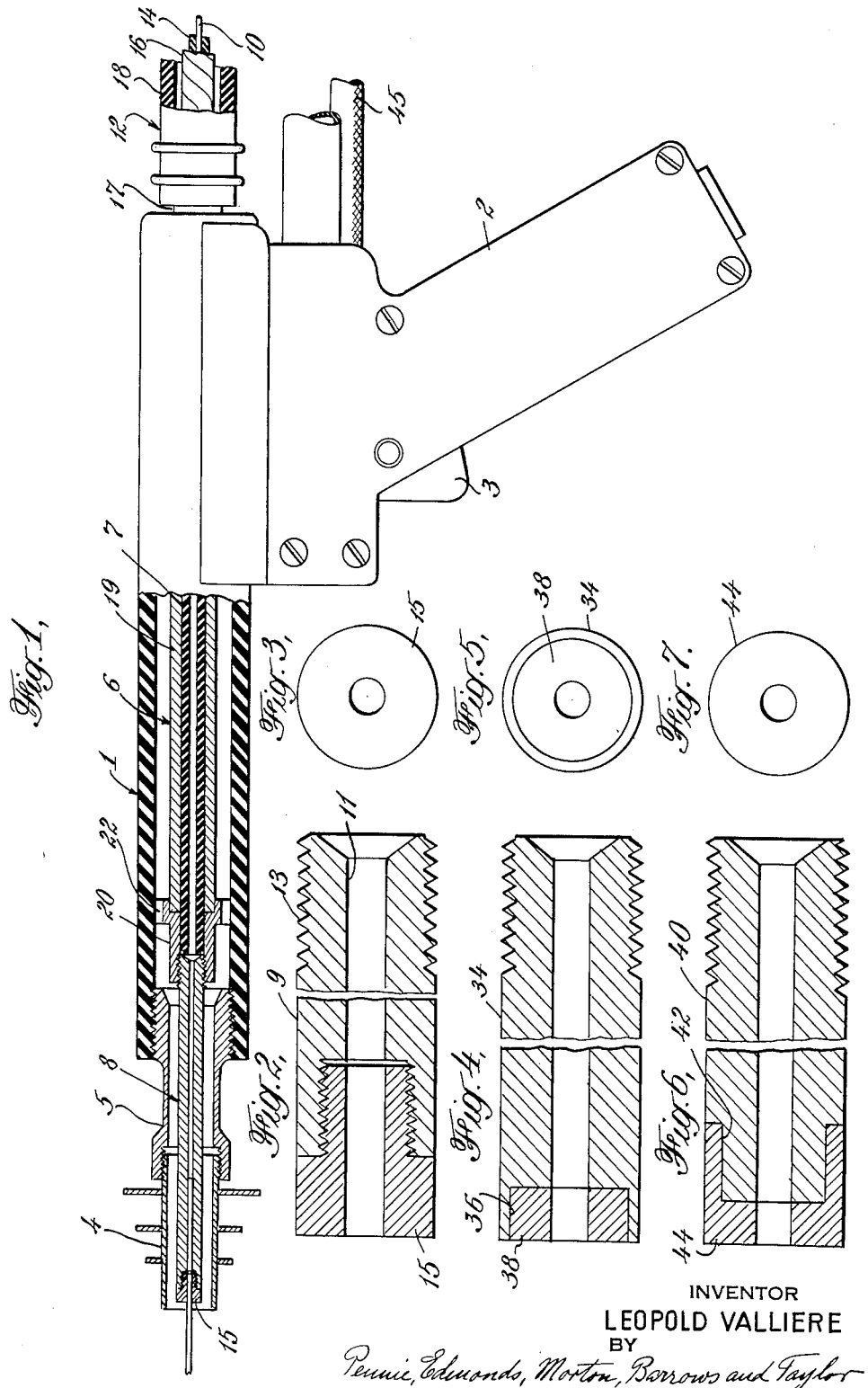
INVENTOR
LEOPOLD VALLIERE
BY
Pennie, Edmonds, Morton, Barrows and Taylor
ATTORNEYS

United States Patent Office 2,735,920
Patented Feb. 21, 1956

2,735,920

WELDING CURRENT CONTACT TUBE

Leopold Valliere, Montreal, Quebec, Canada, assignor to Air Reduction Company, Incorporated, New York, N. Y., a corporation of New York Application July 15, 1952, Serial No. 298,893

6 Claims. (Cl. 219—8)

This invention relates to metal arc welding with a consumable wire electrode and more particularly to the prevention of troublesome and inadvertent welding of the electrode to metallic portions of the welding apparatus through which the electrode is fed to the welding arc.

In metal arc welding with a consumable electrode, an electrode in wire form is continuously fed through a welding "head" or "gun," and an arc is struck between the end of the wire protruding from the gun and the workpiece. The continuously fusing electrode forms a filler material for the weld being made on the workpiece. Various means may be provided to shield the arc and the weld pool against the atmosphere. For example the arc may be protected by an annular stream of inert gas emerging from the gun about the wire.

The welding current employed is typically so high that the passage thereof through any portion of the wire prior to the end which fuses at the arc produces substantial resistance heating of the portion so traversed by the current. It is in general desirable to keep this resistance heating as small as possible. For this reason the welding current is preferably transferred to the electrode at a point within the gun in close proximity to the arc, and it is now known to terminate the wire support in the gun by means of a tubular member of highly conductive metal, called a "contact tube," through which the wire passes and to which the welding current is fed from the generator for transfer to the electrode just prior to its presentation to the arc.

The point beyond the end of the contact tube at which the wire fuses is subject to minor fluctuations which are difficult to control, especially in hand-held equipment, in spite of various special precautions which have been taken for that purpose. It occasionally happens that the rate of wire feed decreases relative to the rate of fusion of the wire sufficiently and for a long enough time so that the wire fuses all the way back to the point at which it emerges from the contact tube. This phenomenon, termed "burn-back" in the art, is very troublesome with contact tubes of the type heretofore used because of the tendency of the wire to fuse to the contact tube itself at the mouth of the latter. When this occurs, welding must be stopped, and the welding gun must be at least partially disassembled to free the wire from the contact tube and to clear the bore of the latter so that the wire may again pass freely through it. Since the tendency of the wire to fuse to the contact tube is directly related to the temperature of the tube, and since the temperature gradient in the tube near its face is very steep due to exposure of that face to the arc, I have found that there is little or no tendency for the wire to fuse to the contact tube a short distance back of the contact tube face.

The present invention provides a contact tube of improved type in which the highly objectionable results of burn-back are obviated. In the contact tube of the invention the mouth of the tube is protected against the welding effect of the wire upon burn-back by the provision thereat of a ring of refractory material to which the fusing wire cannot bond even when it fuses back to the mouth of the contact tube. The composite tube of my invention has the conduction advantages of an all metal contact tube, as well as the ability to resist thermal and mechanical shock inherent in the all metal contact tube, while overcoming the burn back difficulties heretofore encountered with such tubes. My improved contact tube also prevents the adhesion to the tip of weld spatter.

The invention will now be described in terms of a number of preferred embodiments with reference to the accompanying drawings in which:

Fig. 1 is a longitudinal view, partially in section, through a manual welding gun including one form of contact tube according to the present invention;

Fig. 2 is an enlarged longitudinal sectional view of the contact tube of the gun of Fig. 1;

Fig. 3 is a front view in elevation of the contact tube of Fig. 2;

Fig. 4 is a longitudinal sectional view similar to that of Fig. 2 but showing another embodiment of the invention;

Fig. 5 is a front view in elevation of the contact tube of Fig. 4;

Fig. 6 is a longitudinal sectional view showing a further embodiment; and

Fig. 7 is a front view in elevation of the embodiment of Fig. 6.

The gun of Fig. 1 comprises an outer barrel 1, a handle 2, a trigger 3, all of thermally and electrically insulating materials, a gas nozzle 4, a gas nozzle adapter 5 supporting the nozzle from the outer barrel, an inner barrel assembly generally indicated at 6, and a contact tube generally indicated at 8.

The wire electrode 10 is fed from the rear of the gun down through the inner barrel assembly and through the contact tube to emerge at the front of the gun where it is presented to the arc. The wire reaches the gun from a supply source, not shown, through a flexible conduit generally indicated at 12. The conduit 12 includes an insulating liner 14, of nylon for example, which fits within a flexible metal casing 16, and a flexible tube 18 of rubber or the like having an inner diameter larger than the outer diameter of the casing 16. The conduit 12 is affixed to the rear of the gun by means of a threaded fitting 17, engaging the outer barrel 1, and the whole is so arranged as to keep the wire 10 electrically insulated from the metallic casing 16 and from the source of welding potential except at the contact tube 8. For this purpose, the inner barrel assembly 6 comprises a metallic barrel 19 provided with an insulating liner 7 which may be made of nylon or another tough low-friction plastic material.

The annular space between the flexible tube 18 and the casing 16 serves for the supply of shielding gas to the gun which is then fed down through the annular space between the outer and inner barrels 1 and 6 to emerge in an annular stream about the electrode between the contact tube 8 and the gas nozzle 4.

The inner barrel assembly is supported adjacent its front end coaxially with the outer barrel by means of a metallic sleeve 20 into which the inner barrel 19 fits at a counterbore. The sleeve is apertured as at 22 to permit the passage of the shielding gas.

The contact tube 8 is affixed to the sleeve 20 by means of a threaded connection at its rear end. The welding current is fed to the contact tube from a cable 45 and thence by suitable fittings to the inner barrel 19 and to the sleeve 20, to which the contact tube is affixed. The contact tube is customarily dimensioned so as to terminate a short distance in back of the front end of the gas nozzle.

As illustrated in Fig. 2 the contact tube includes a generally tubular member 9 of metal having good electrical conductivity, bored at 11 to receive the welding electrode. The bore 11 should be no more than a few thousandths of an inch larger in diameter than the diameter of the wire electrode to be passed therethrough in order to insure adequate contact for the transfer of welding current to the electrode. At its rear end the tubular member 9 includes a thread 13 for affixation of the contact tube to the welding gun. The contact tube includes at its front end an annular member 15 of refractory material such as carbon, preferably in hard form, supported from the tubular member 9 by means of a threaded connection. The refractory tip 15 shields the front face of the contact tube from exposure to the fused electrode wire in the event of burn-back, as illustrated in Fig. 3. Upon burn-back, the electrode, although fusing back as far as the contact tube, is unable to weld itself thereto because of the refractory nature of the member 15. Carbon provides a suitable material for the refractory member, since this material combines the desired refractory properties which prevent welding of the electrode thereto with a useful degree of electrical conductivity. Other refractory materials may however be used whether or not electrically conductive.

The annular refractory member may take other shapes than that shown in the embodiment of Figs. 2 and 3. In the embodiment of Figs. 4 and 5 the conductive tubular member 34 is provided at its front end with a cylindrical recess or counterbore 36, in which is received a ring-shaped refractory insert 38, of carbon or other refractory material to which the fused electrode will not bond. The insert 38 may be held in place by means of a frictional fit in the recess 36, or a threaded connection may be provided. As seen in Fig. 5 the contact tube of Fig. 4 is protected from the fused electrode wire in the event of turn-back over its front face in the vicinity of the bore through which the wire passes.

Figs. 6 and 7 show still another form of contact tube according to the invention, in which the tubular conductive member 40 is provided with a cylindrical portion 42 of reduced diameter at its front end for the support of an annular refractory tip 44 having a counterbore fitting over the reduced portion 42. As in the case of the other embodiments illustrated, the refractory tip 44 may be affixed to the conducting tubular member 40 by any desired means. Fig. 7 illustrates how the contact tube of Fig. 6 like that of Fig. 2 is shielded over its entire front face from the effect of burn-back of the wire electrode.

I claim:

1. In welding apparatus for use with a consumable wire electrode, a tubular welding current contact member of electrically conductive material having a smooth bore through which the electrode is passed in continuous contact therewith for presentation to the arc, and a ring of refractory material arranged on the end of said member adjacent the arc, said ring having an inner diameter substantially equal to the diameter of said bore.

2. In a welding gun, a contact tube comprising a tubular member of conductive material having a smooth bore adapted to accommodate closely a consumable wire electrode, and an annular member of refractory material disposed on the end of said tubular member, said annular member shielding at least the radially inner portion of the end face of said tubular member.

3. A welding current contact tube comprising a tubular member of conducting metal having a smooth bore through which a consumable wire electrode is adapted to be passed in contact with the walls of said bore, and an annular member of electrically conductive refractory material arranged on one end of said tubular member, said annular member overlying one end face of said tubular member at least in the vicinity of the bore in said tubular member.

4. A welding current contact tube comprising a tubular member of conducting metal having a smooth bore through which a consumable wire electrode is adapted to be passed in contact with the walls of said bore, and an annular member of carbon arranged on one end of said tubular member, said annular member overlying one end face of said tubular member at least in the vicinity of the bore in said tubular member.

5. A welding current contact tube for use in metal arc welding apparatus employing a consumable wire electrode, said contact tube comprising a tubular member of conducting metal having a bore through which a consumable electrode wire is adapted to be passed in contact with the walls of said bore, an internally threaded counterbore in one end of said member, and an annular member of refractory material having a bore of substantially the same diameter as the bore of said tubular member, said annular member having an externally threaded portion adapted to engage said threaded counterbore, said annular member having a maximum outer diameter substantially equal to the outer diameter of said tubular member.

6. A welding current contact tube for use in metal arc welding apparatus employing a consumable wire electrode, said contact tube comprising a tubular member of conducting metal having a bore through which a consumable electrode wire is adapted to be passed in contact with the walls of said bore, an internally threaded counterbore in one end of said member, and an annular member of carbon having a bore of substantially the same diameter as the bore of said tubular member, said annular member having an externally threaded portion adapted to engage said threaded counterbore, said annular member having a maximum outer diameter substantially equal to the outer diameter of said tubular member.

References Cited in the file of this patent

UNITED STATES PATENTS

| 1,335,584 | Lake | Mar. 30, 1920 |
| 2,478,525 | Cutrer | Aug. 9, 1949 |

FOREIGN PATENTS

| 371,814 | Great Britain | Apr. 19, 1932 |